Dec. 11, 1945.   H. M. HEUVER   2,390,534
APPARATUS FOR DETERMINING PRESSURE DISTRIBUTION
ON AIRFOILS AND THE LIKE
Filed Nov. 17, 1944   4 Sheets-Sheet 1
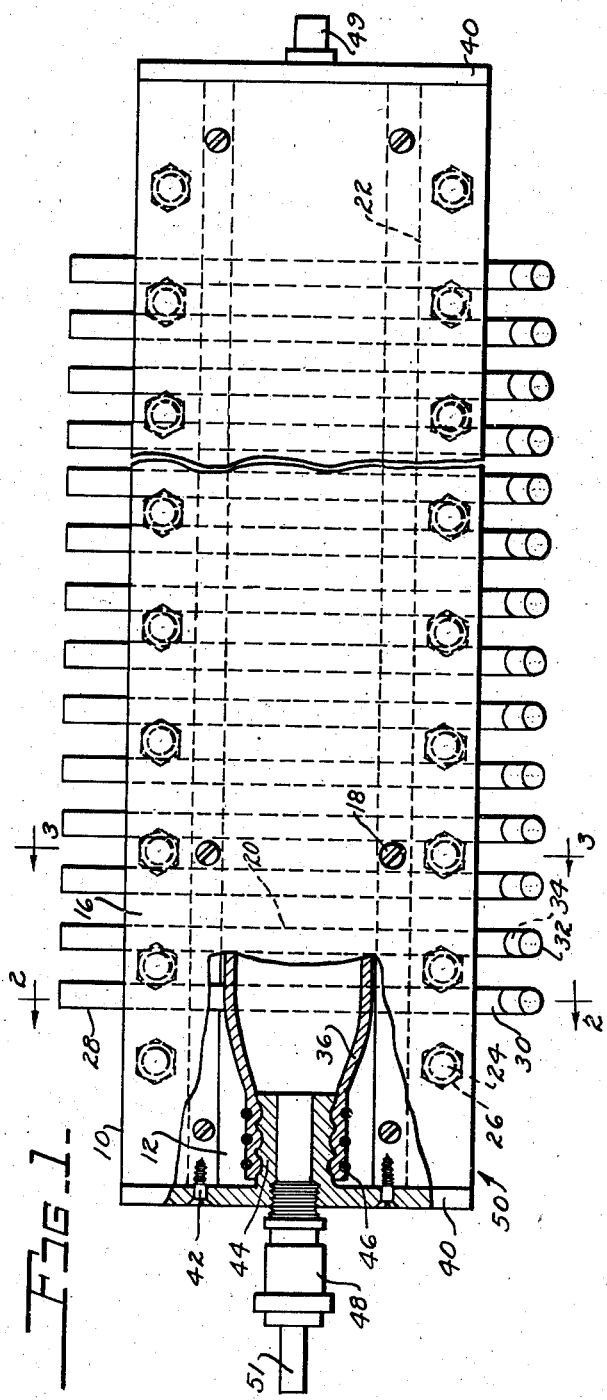
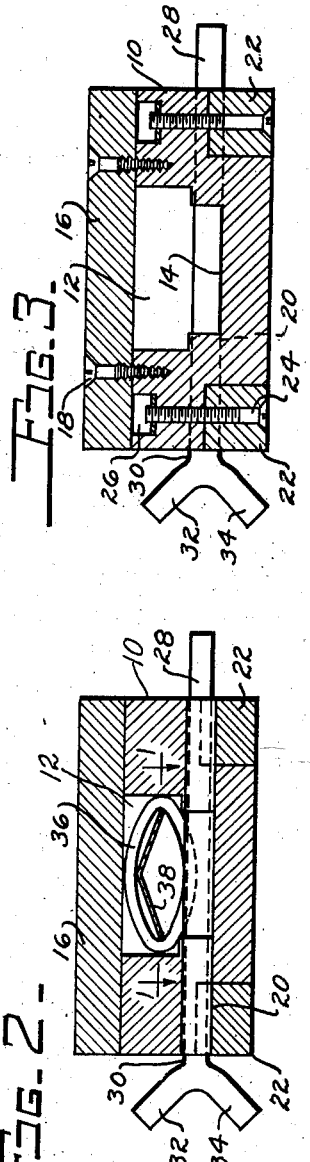
INVENTOR.
HERBERT M. HEUVER
BY
ATTORNEYS

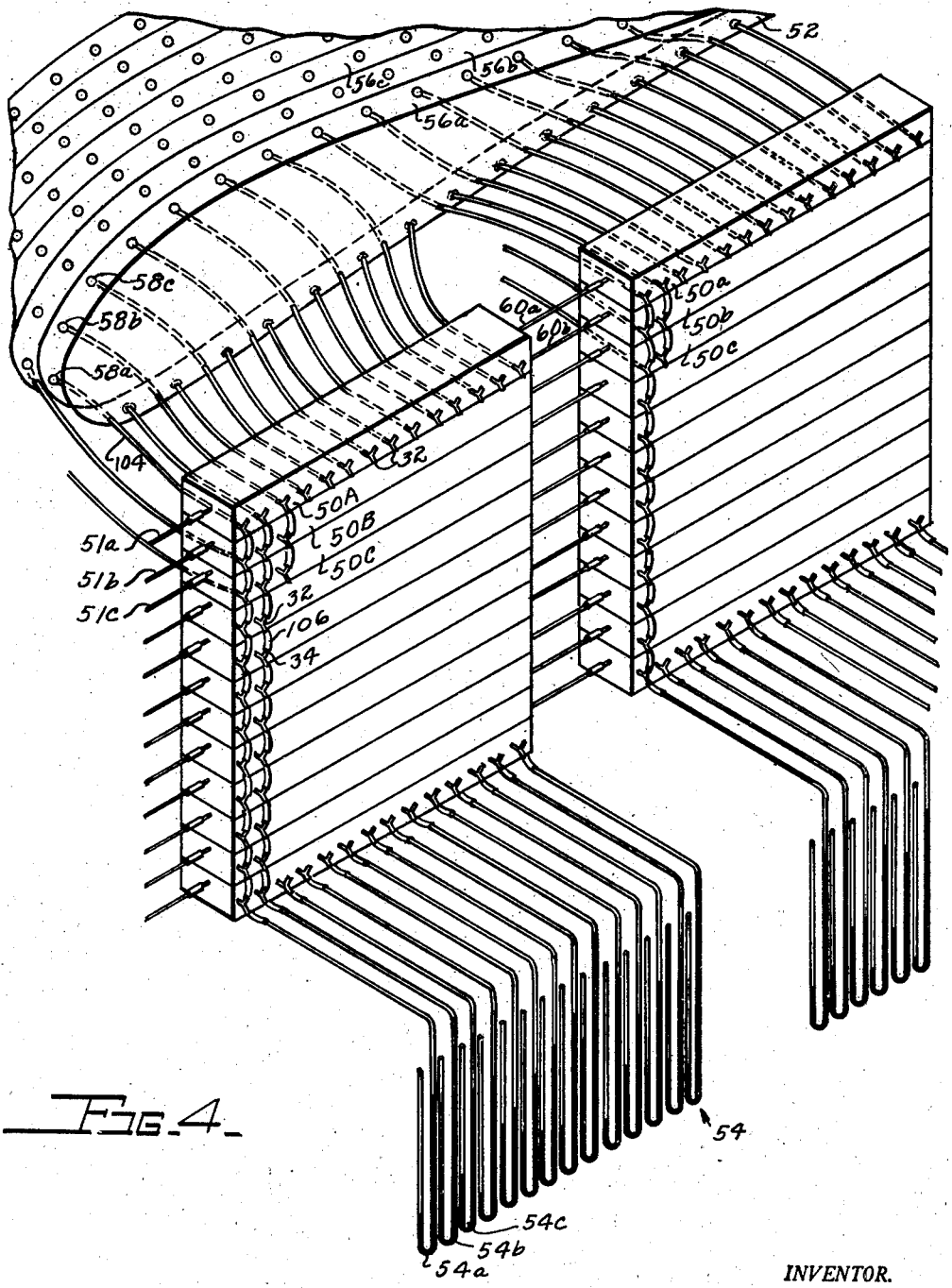

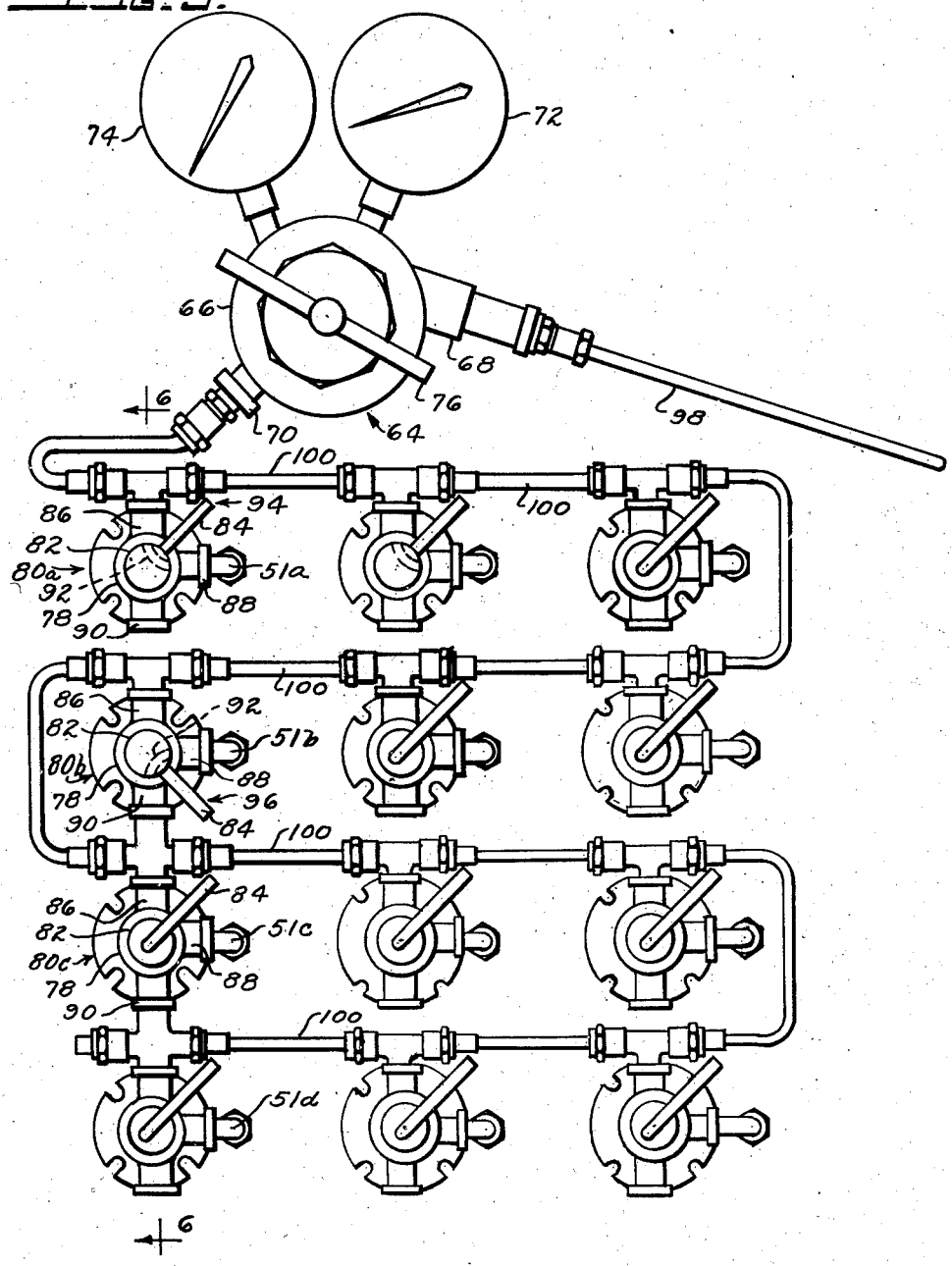

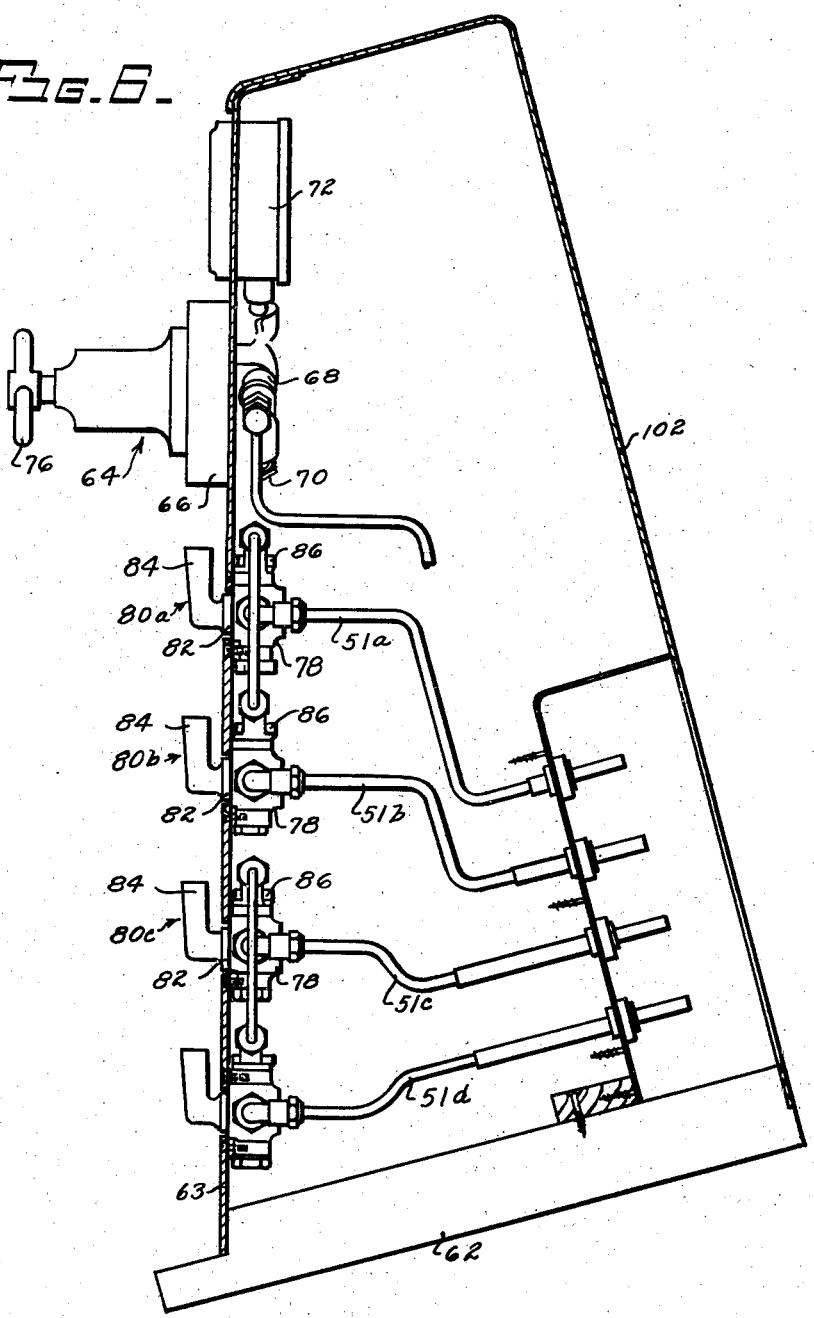

Patented Dec. 11, 1945

2,390,534

UNITED STATES PATENT OFFICE 2,390,534

APPARATUS FOR DETERMINING PRESSURE DISTRIBUTION ON AIRFOILS AND THE LIKE

Herbert M. Heuver, Dayton, Ohio

Application November 17, 1944, Serial No. 563,977

3 Claims. (Cl. 73—147)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus for expediting the determination of pressure distribution on the surfaces of airfoils or the like. It is particularly applicable for recording the results of wind tunnel tests.

An object of the invention is to provide means for indicating and recording the pressure on the surfaces of a wing or the like at a plurality of points simultaneously.

Another object is to so construct and arrange the controls of the apparatus that indications of the pressures at the desired points over the entire surface of an airfoil may be had by the operator without moving from his position at the control board.

Inasmuch as, for the purpose of proper analysis it is usually desirable to determine the pressure at not less than several hundred points on the surface of a single wing, and inasmuch as a multiple manometer having a tube for each of the several hundred points would be too costly as well as too cumbersome, it is another object of this invention to divide the points to be pressure tested into groups, provide a manometer with a number of tubes equal to the number in one group then provide a multiple valve means for selectively connecting one after the other of the groups to the manometer.

Other objects and advantages will become evident as the invention is described in detail and reference is had to the drawings, wherein:

Fig. 1 is a top plan view of a valve block which contains a group of valves all closable by the application of pressure to a single connection, a portion of the view being broken away to the line 1—1 of Fig. 2 to show the interior construction.

Fig. 2 is a transverse section taken at 2—2 of Fig. 1 showing the means employed for shutting off a group of tubes which extend from the manometer tubes to points on the wing which are to be evaluated.

Fig. 3 is a transverse section taken at 3—3 of Fig. 1 showing the manner in which the several parts of the valve block are secured in place.

Fig. 4 is a perspective view of that portion of the apparatus which is installed in the wind tunnel, namely, the wing model, valve blocks containing a number of valves equal to the points on the wing being tested and a multiple manometer having tubes equal to the number of valves in each group.

Fig. 5 is a front view of the selective valve mechanism which is installed in the control room for operating the groups of manometer valves.

Fig. 6 is a vertical section taken at 6—6 of Fig. 5 showing one bank of the selector valves.

Like numerals refer to like parts throughout the drawings.

Referring now to the drawings, a valve block 10 has a longitudinally extending channel 12 and a smaller channel 14 in the bottom of the first channel (see Fig. 3). Channels 12 and 14 extend the entire length of the valve block and a cover 16 is secured over them by screws 18. A plurality of small circular openings extend crosswise through the valve block for the flexible valve tubes 20 which have a length equal to the width of the block. The lower corners of the block 10 are cut away for the valve tube clamping strips 22 which are provided with adjusting screws 24 having nuts 26. Tubular metal nipples 28 are inserted in one of the ends of the flexible valve tubes 20, while similar nipples 30 having Y end connections 32 and 34 are inserted in the other ends of the valve tubes. Tightening of the screws 24 seals the metal nipples 28 and 30 in the flexible valve tubes 20 and holds the flexible valve tubes 20 positioned in the block 10 with their mid-portion exposed where they cross the channel 14. A relatively large valve shut-off hose 36 of flexible material is normally held, by a flat spring 38, to an oval shape which substantially fits the larger channel 12. The ends of the valve block 10 are closed by end plates 40 which are attached by screws 42. End plates 40 have integral nipples 44 extending inwardly, the ends of the hose 36 being bound to the nipples as at 46. The end plates are internally threaded for the fitting 48 by which one of the pressure lines 51 is connected to supply pressure to the interior of the shut-off hose 36, the tapped opening in the end plate at the opposite end of the block being plugged as at 49. Pressure applied to the valve shut-off hose 36 will expand it into a round cross section whereby the flexible valve tubes 20 will be closed.

The foregoing, taken in conjunction with Figs. 1, 2, and 3, completes the description of one valve block and its associated parts which, for purposes of further discussion, may hereinafter be referred to as a valve block assembly and be broadly designated by the numeral 50. It should be noted that the valve block arrangement shown lends itself particularly to the present invention or to any similar service where the pressure at a large number of separate points is to be measured, since a greater number of individual valves may be got into the limited space available than by any other presently known construction.

It will be apparent that some modification may be made in the valve structure, as for instance, instead of providing the two channels 12 and 14, the channel 12 may be maintained at the width shown but have a depth equal to that of both channels 12 and 14 taken together. A group of valves which are opened or closed by manipulation of a single one of the selector valves hereinafter described may comprise only one valve block assembly 50 or it may comprise several of these assemblies connected in series.

In the perspective view Fig. 4, there is shown a test wing 52 together with the several valve block assemblies 50A, 50B, etc. and the multiple manometer 54 composed of individual manometer tubes 54a, 54b, 54c, etc., the several points on the wing to be evaluated being connected through the several valves to the individual manometer tubes by metal tubing.

For purposes of illustration only, the surface of the wing is shown as being divided into twelve sections, namely, 56a, 56b, 56c, etc., with twenty eight openings 58a, 58b, 58c, etc., in each section, part in the top and part in the bottom. The shut-off hose 36 of two assemblies 50A and 50a, etc., are connected in series by the tubes 60a, 60b, etc., the two blocks together having at least as many valves as there are points 58a, 58b, etc., in one group of wing openings.

The wing 52, valve block assemblies 50 and multiple manometers 54 are connected in a relatively close group as shown, and may be together contained in the wind tunnel, but the tubes 51a, 51b, 51c. etc., which emanate from the flexible shut-off hose 36 may preferably be extended to a control room outside the wind tunnel, the tubes 51a, 51b, 51c, etc., being there connected, each to its individual selector valve.

Figs. 5 and 6 show the selective valve mechanism by means of which a plurality of the shut-off hose 36 are controlled. It comprises a base 62 which supports a control panel 63 upon which is mounted a pressure regulating valve 64 of the type having a body 66, a pressure inlet 68, a pressure outlet 70, a gauge 72 indicating the pressure at the inlet, a gauge 74 indicating the pressure at the outlet and a control handle 76 for regulating the outlet pressure.

Mounted also on the panel 64 are a series of selector valves 80a, 80b, 80c, etc., of the type consisting of a body 78 containing a cylindrical plug 82 rotatable through one-quarter turn by a handle 84. The body 78 has an inlet port 86, an outlet port 88 located ninety degrees from the inlet port, and a relief port 90 located ninety degrees from the outlet port. The rotatable plug 82 has a port 92, the inlet and outlet end of which span ninety degrees, whereby when the valve is turned to the position shown at 94, the inlet and outlet ports 86 and 88 are connected, and when the valve is turned to the position shown at 96, the outlet port 88 and the relief port 90 are connected.

The inlet 68 of the pressure regulating valve 64 is connected to any suitable source of pressure by tubing 98, while the outlet 70 is connected to the inlet port 86 of all of the selector valves in parallel by tubing 100. A cover 102 encloses the control panel mechanism.

The operation of the mechanism in determining pressure distribution is as follows:

The number of test points in a section of the wing surface in the example shown is 28 and there are 12 sections. Since the valve block assemblies have fourteen valves, a group of two blocks in series takes care of one wing section, and a stack of these groups twelve high takes care of the twelve wing sections.

Holes are provided in the wing skin at the desired test points and relatively short lengths of tubing 104 are used to connect the inner side of these holes to the nipples 28 of the valve block assemblies. The top row of Y connectors 32 are then plugged, intermediate the top and bottom rows the ends designated 32 are connected to the ends designated 34 by short lengths of flexible tubing 106, and the bottom row of ends designated 34 are connected to the individual manometer tubes 54a, 54b, etc. All selector valves 80a, 80b, etc., are turned to the position 94 whereby pressure is conveyed to all shut-off hose 36 to bring them to circular cross section and the individual valves of all the valve block assemblies are closed.

Turning any one of the twelve selector valves, as for instance turning the selector valve 80b, to the position 96, will cut off the pressure to the group of valves in the valve block assemblies 50B and 50b, whereupon the flat springs 38 will return the shut-off hose to the ovate form of Fig. 2 and the valves in valve block assemblies 50B and 50b will be open and the openings in the second wing section 56b will be connected to the tubes 54a, 54b, etc., of the multiple manometer 54. The graduations in the manometer tubes may then be read individually and recorded or a photograph may be taken showing the state of all of the tubes. The handle 84 may then be returned to its original position which will inflate the shut-off hose 36 in block assemblies 50B and 50b and all valves will again be closed. By turning the selector valves one after the other from the position 94 to the position 96 then back to the position 94, the manometer tubes will have recorded the pressures on the wing surfaces at all of the test openings, one group at a time.

I claim:

1. For determining the air pressure distribution on the surface of an airfoil or the like, the apparatus which comprises a plurality of manometer tubes, a plurality of valves equal to the number of points on said surface at which the pressure is to be evaluated, said valves being arranged in groups, each group having a number of valves equal to the number of manometer tubes, a plurality of control means equal to the number of groups, each control means being constructed and arranged to operate all the valves of one group simultaneously, conduit means for connecting the manometer tubes to one side of the valves of a group, and conduit means for connecting each of said points to the other side of one of the valves.

2. For evaluating the air pressure distribution on the surface of an airfoil or the like, the apparatus which comprises a multiple manometer having a plurality of manometer tubes, a plurality of groups of valves together having a number of valves equal to the number of points on said surface at which the pressure is to be evaluated, each group having a number of valves equal to the number of manometer tubes, a remote control means for each group constructed and arranged to operate all of the valves of said group coincidentally, conduit means connecting one side of each valve to one of said points, and conduit means connecting the other side of each group to said manometer tubes in parallel.

3. For determining the distribution of air pressure over the surface of an airfoil or the like, the apparatus which comprises a plurality of valves equal to the number of points on said surface at which the pressure is to be evaluated, said valves being arranged in groups, a plurality of manometer tubes equal in number to the number of valves in one group, conduit means connecting said points to one side of said valves, conduit means connecting each manometer tube in parallel to the other side of as many valves, each in a different group, as there are groups, and a plurality of remote control means equal to the number of groups, each control being constructed and arranged to operate all the valves of one group simultaneously.

HERBERT M. HEUVER.